United States Patent [19]
Rich

[11] Patent Number: 4,801,008
[45] Date of Patent: Jan. 31, 1989

[54] DISPENSING DEVICE HAVING STATIC MIXER IN NOZZLE
[75] Inventor: Thomas R. Rich, Salem, Mass.
[73] Assignee: W. R. Grace & Co., Lexington, Mass.
[21] Appl. No.: 212,165
[22] Filed: Jun. 24, 1988

Related U.S. Application Data
[63] Continuation of Ser. No. 020,271, Mar. 2, 1987, abandoned.
[51] Int. Cl.4 .............................................. B65D 25/40
[52] U.S. Cl. .................................... 206/219; 222/566; 366/339; 206/384
[58] Field of Search ....................... 206/384, 219, 222; 366/336–340; 222/566–568

[56] References Cited
U.S. PATENT DOCUMENTS

| | | | |
|---|---|---|---|
| 1,123,035 | 12/1914 | Tanner | 222/567 X |
| 2,802,648 | 8/1957 | Christensen et al. | 366/340 X |
| 3,286,992 | 11/1966 | Armeniades et al. | 366/339 |
| 3,521,745 | 7/1970 | Schwartzman | 206/222 |
| 3,593,964 | 7/1971 | Morane | 366/340 |
| 3,915,297 | 10/1975 | Rausch | 206/219 |
| 3,941,355 | 3/1976 | Simpson | 366/336 |
| 4,193,698 | 3/1980 | Gartner | 206/219 X |
| 4,353,463 | 10/1982 | Seemann | 206/222 |
| 4,522,504 | 6/1985 | Greverath | 366/339 |

Primary Examiner—William Price
Attorney, Agent, or Firm—Bart G. Newland; William L. Baker

[57] ABSTRACT

Disclosed is a disposable cartridge including a chamber containing a plurality of inter-reacting components of, e.g., an adhesive system. The components are separated from each other by a barrier film formed by reaction therebetween. The components are expelled through a nozzle housing a static mixing element, the nozzle being adapted to trap the barrier film to prevent clogging. The nozzle includes a frusto-conical entry portion designed to ensure a constant mix-ratio profile between the components.

2 Claims, 2 Drawing Sheets

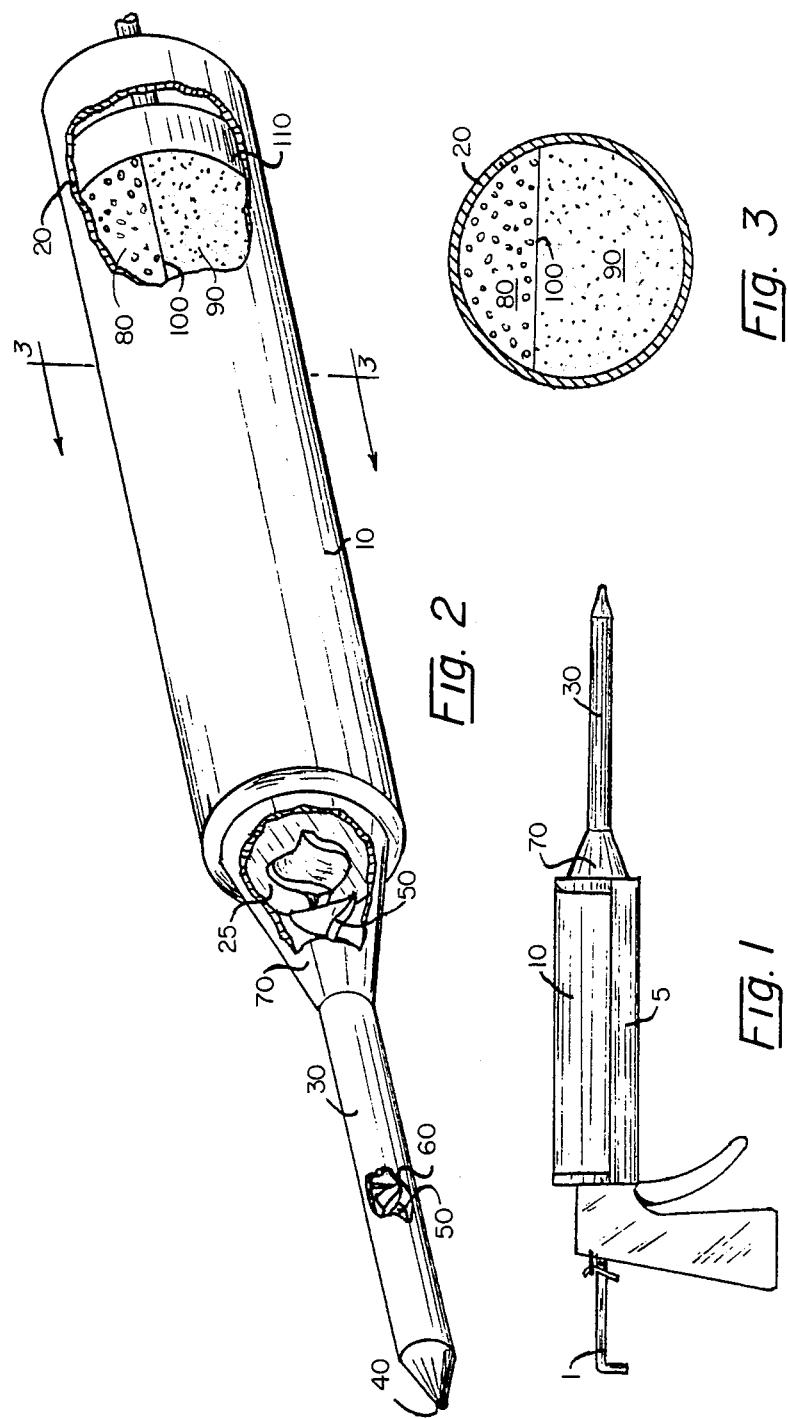

DISPENSING DEVICE HAVING STATIC MIXER IN NOZZLE

This is a continuation of co-pending application Ser. No. 020,271, filed on Mar. 2, 1987, and now abandoned.

BACKGROUND OF THE INVENTION

The present invention is directed to apparatus for dispensing two-or-more-component adhesives, sealing compounds, putties, grouts, coatings and the like. The reactive components are separated within the chamber of the device by barriers formed as reaction products of the components. During dispensing these "reacted barriers" are trapped by the novel nozzle so that they do not clog the exit orifice of the device. This invention is particularly useful for dispensing epoxy, polyurethanes and polyester resins used to secure bolts in boreholes in construction applications.

Plural component adhesive systems are highly desired because of the ability to tailor properties of the final product. For example, viscosity, cure rate, green and final strength can be controlled by varying one or more components. The components must be thoroughly mixed during dispensing for plural component systems to be effective, however. Mixing is usually difficult in hand-operated equipment due to the high viscosity of the components and substantial pressure drop across any static mixing devices employed.

Static mixers are known to provide thorough mixing of multi-component adhesive resins. U.S. Pat. No. 4,538,920, for example, teaches a multi-barreled dispensing device including a static mixing element. The static mixer is an elongate convoluted member housed within the bore of the exit nozzle of the device. Incoming resin streams are mixed by the mixing blades of the static mixer and emerge thoroughly mixed therefrom.

The use of multi-component cartridges is well known. Each component must be kept physically separated from each of the others in order to avoid chemical reactions therebetween. The aforementioned U.S. Pat. No. 4,538,920 teaches separate tubes or "barrels" for each of the components. U.S. Pat. No. 4,493,436 relates to a compartmental cartridge having a barrier wall separating components. The barrier wall is stored, during dispensing, in the evacuated portion of the cartridge.

A further method of separating components in a cartridge is the provision of "reacted barriers" therebetween. For example, resin and hardener of a two-part epoxy adhesive system may be carefully placed within a cartridge. A thin wall of reaction product forms therebetween and serves to isolate the components from each other. U.S. Pat. No. 3,915,297 relates to a cartridge containing polyester resin and catalyst which are separated by a polymerized (reacted) interface.

While the reacted barrier-type cartridges offer advantages over other styles of multi-chambered cartridges, dispensing product therefrom is complicated by the presence of the barrier skin. This skin can dislodge and clog the output orifice of the dispenser. Accordingly, it is one object of the present invention to provide an improved cartridge which (1) provides a constant mix profile among multiple components, (2) thoroughly mixes components of a multi-component cartridge, (3) traps reacted barriers to avoid clogging of the mixer and/or output orifice and (4) requires relatively less pressure, in order to hand-dispense its product, than known devices.

SUMMARY OF THE INVENTION

These and other objects of the invention are attained by a cartridge including a chamber portion containing interactive components of a self-setting composition, the components being separated by reacted barrier(s). A nozzle is connected to one end of the chamber and has an elongated tubular portion, housing a static mixing element, out of which the mixed components are expelled. The portion of the nozzle which is immediately downstream of the chamber is advantageously frusto-conical in shape in order to avoid a sharp pressure drop and ensure a constant mix ratio profile. The static mixing element or similar structure extends back into the frusto-conical portion so that it can trap the reacted barrier which becomes impinged upon it during dispensing. Thus, the reacted barrier does not clog the device. The cartridge is adapted to be placed in a conventional hand-operated caulking gun for dispensing.

The invention will be better understood from the accompanying drawing in which:

FIG. 1 is a view of the present invention installed within a conventional hand-operated caulking gun;

FIG. 2 is a partially cut-away perspective view of the invention;

FIG. 3 is a transverse sectional view of the cartridge of FIG. 2;

DETAILS

Figure 4:
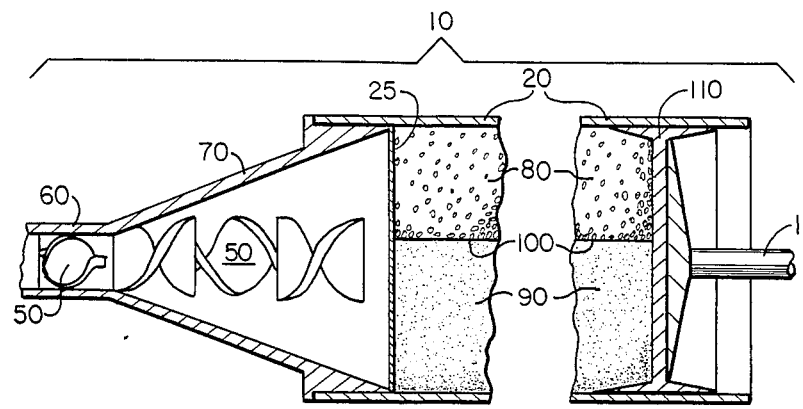
FIG. 4 is a cross sectional view of the present invention prior to dispensing product.

Referring now to FIG. 1, the present invention is a cartridge, designated generally by the reference numeral 10, for dispensing components of adhesive, grout or putty systems and the like. The cartridge 10 is adapted to be installed within a conventional caulking gun 5, wherein a piston disposed at the end of rod 1 expels product from the cartridge. Cartridge 10 includes a nozzle, designated generally by the reference numeral 30, which includes a frusto-conical portion 70 and an elongated forward portion 60.

As seen in greater detail in FIG. 2, cartridge 10 includes a chamber portion 20 containing a plurality of components (here two components 80, 90) which are adapted to form a self-setting composition when mixed. For example, these components can comprise polyester, polyurethane or epoxy-based adhesives. The present device also is well suited to dispense single and multi-component caulks, grouts and other sealing compounds.

Nozzle 30 is disposed at one end of chamber 20 and is designed to receive the plural components, mix them and then dispense them through orifice 40. Nozzle 30 consists of a frusto-conical portion 70 which receives product from chamber 20 and an elongated forward portion 60 which terminates with exit orifice 40. A static mixing element, designated 50, is housed within the elongated forward portion 60 of nozzle 30. Such static mixers are known (see U.S. Pat. No. 4,538,920) and consist of a multi-vaned, elongated member which promotes the mixing of materials passing therethrough. As seen in FIG. 1, the ends of forward portion 60 of the nozzle 30 are crimped so that the static mixer 50 is not expelled through orifice 40. An important aspect of the invention is the extension of static mixer 50 (or a functionally similar structure) beyond the upstream end of forward portion 60 and into the interior of frusto-conical portion 70 of nozzle 30.

The chamber portion 20 of the cartridge 10 depicted in the FIG. 2 has been filled in a known manner with two interactive components 80 and 90, e.g. epoxy resin and hardener, of a self-setting adhesive composition. Because the components are in intimate contact, a film 100 of the reaction product of components 80 and 90 has formed. The formation of film 100 has isolated components 80 and 90 from each other, and thus the reaction does not progress further and consume the components. The chamber portion is sealed at its forward end by an aluminum foil or plastic film 25 and at its rear end by a plunger 110 as is known in the art.

As seen in FIG. 3, components 80 and 90 need not be present in a one-to-one ratio. Advanced adhesive systems are custom blended and may require any number of components to be present in different proportions. Reacted barriers may not form between each of the components. The present invention provides efficient mixing and dispensing of widely varying formulations.

Figure 5:
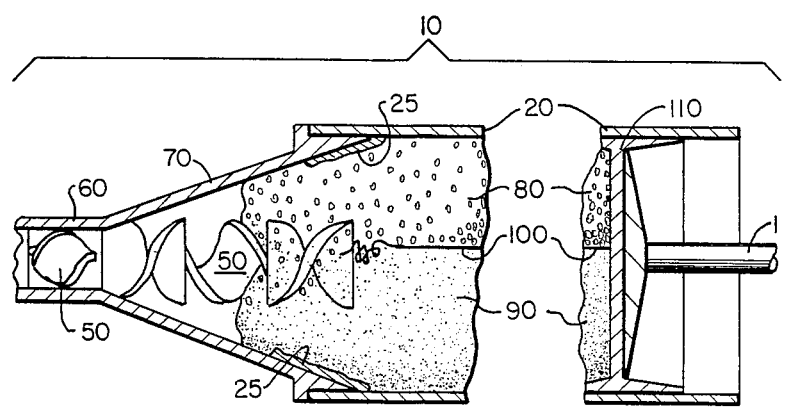
FIG. 5 is a cross sectional view while dispensing is in progress.
Figure 6:
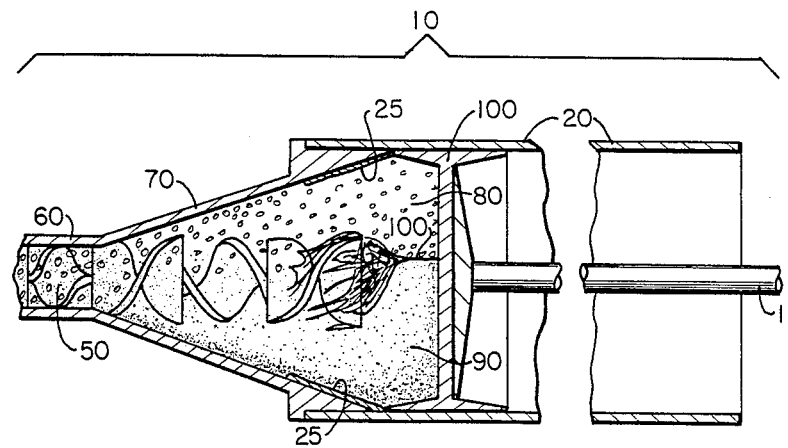
FIG. 6 is a cross sectional view of the present invention following dispensing of product.

In use, the present cartridge is placed within a conventional hand-held caulking gun. FIG. 4 illustrates the invention prior to dispensing; front seal 25 retains components 80 and 90, while the piston of the gun rests on plunger 110. In use (FIG. 5) the plunger of the gun urges forward plunger 110 which forces the components to rupture sealing film 25 and to travel into portion 70 of nozzle 30. Further pressure forces the components through static mixer 50 where they are intimately mixed, and out through orifice 40. Reacted barrier film 100 collapses during dispensing, but is trapped by static mixer extension 50 within portion 70, and thus does not clog the nozzle. The frusto-conical portion 70 ensures a constant mix ratio profile while affording relatively little flow restriction during barrier (100) impingement. FIG. 6 illustrates the device following dispensing. The reacted barrier remains impinged upon the static mixer within portion 70.

Various materials and methods for the manufacture of the present cartridge are apparent to those skilled in the art. One preferred embodiment consists of a chamber portion made of a rigid cardboard casing lined with a plastic film, or a plastic chamber, and a nozzle portion molded of a tough synthetic material such as polystyrene, polyethylene, polypropylene or nylon. The nozzle and chamber portion may be supplied as an integral unit or as separate parts designed to be mated prior to use. The present cartridge is designed to be disposed of after use; thus, manufacturing costs should be kept low by the choice appropriate materials.

Various modifications and alterations of this invention, within the spirit and scope of the appended claims, will be apparent to those skilled in the art. For example, a static mixing element of different geometry may be employed, so long as the components are suitably mixed upon exiting the device.

What is claimed is:

1. A dispensing device, containing a plurality of interactive components adapted to be mixed together to form a self-setting composition and comprising:

a chamber portion containing said interactive components, said components being separated by one or more reacted barriers, and a nozzle means for mixing and dispensing said components comprising a frustro-conical portion including an interior wall and having its base disposed at one end of the chamber portion and an elongated portion disposed at the apex of the frusto-conical portion, the elongated portion having static mixing means therein, and entrapment means disposed within said frustro-conical portion and spaced apart from the interior wall, adapted to trap said reacted barrier while allowing said interactive components to flow therepast.

2. A cartridge according to claim 1 wherein said static mixing means extends beyond the elongated portion and into said frustro-conical portion and comprises said entrapment means.

* * * * *